US008649589B2

(12) United States Patent
Gareau

(10) Patent No.: US 8,649,589 B2
(45) Date of Patent: Feb. 11, 2014

(54) NONINVASIVE ASSESSMENT OF KERATINOCYTES

(75) Inventor: Dan S. Gareau, Portland, OR (US)

(73) Assignee: Oregon Health and Science University, Portland, OR (US)

( * ) Notice: Subject to any disclaimer, the term of this patent is extended or adjusted under 35 U.S.C. 154(b) by 158 days.

(21) Appl. No.: 13/407,667

(22) Filed: Feb. 28, 2012

(65) Prior Publication Data
US 2012/0219205 A1   Aug. 30, 2012

Related U.S. Application Data

(60) Provisional application No. 61/447,501, filed on Feb. 28, 2011.

(51) Int. Cl.
*G06K 9/00* (2006.01)
*C12Q 1/68* (2006.01)

(52) U.S. Cl.
USPC .............................. 382/133; 382/274; 435/6.1

(58) Field of Classification Search
USPC ......... 382/100, 106–107, 128–134, 162, 168, 382/173, 181, 203, 209, 224, 232, 254, 274, 382/276, 305, 312; 424/130.1; 702/19; 435/8, 6, 6.1; 600/300
See application file for complete search history.

(56) References Cited

U.S. PATENT DOCUMENTS

| 2003/0148295 | A1* | 8/2003 | Wan et al. .................. 435/6 |
| 2007/0038384 | A1* | 2/2007 | Kirk et al. .................. 702/19 |
| 2008/0279844 | A1* | 11/2008 | Mehta et al. .............. 424/130.1 |
| 2009/0176260 | A1* | 7/2009 | Wu et al. .................... 435/8 |
| 2010/0292543 | A1* | 11/2010 | Levitt et al. ............... 600/300 |

* cited by examiner

*Primary Examiner* — Seyed Azarian
(74) *Attorney, Agent, or Firm* — Schwabe, Williamson & Wyatt

(57) ABSTRACT

Embodiments herein provide methods for noninvasive assessment of keratinocytes. Digital imaging and processing of gray-levels are used to identify cells. More specifically, embodiments provide an automated algorithm that may be used to identify keratinocytes, and/or to specify the coordinates/locations of keratinocytes, through noninvasive confocal imaging.

22 Claims, 1 Drawing Sheet

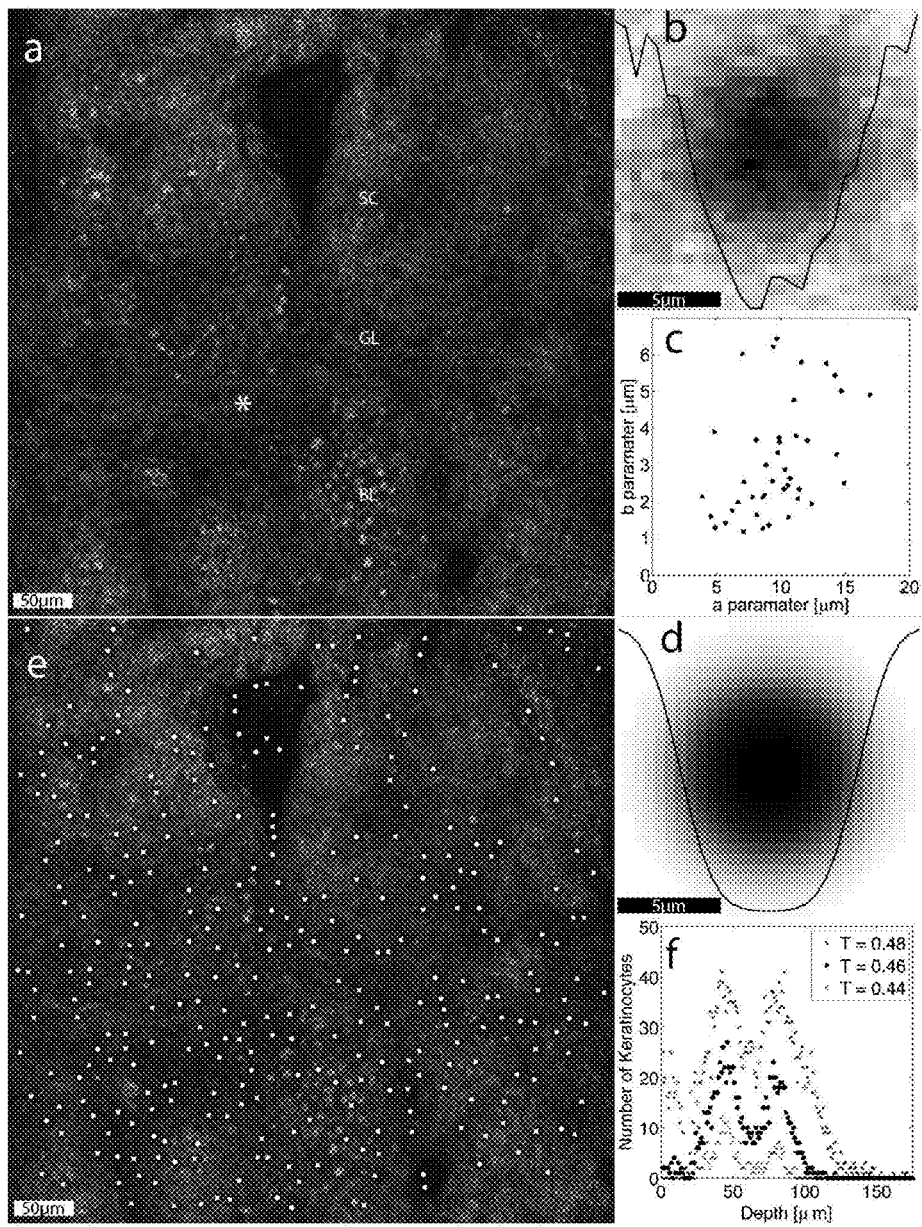

US 8,649,589 B2

NONINVASIVE ASSESSMENT OF KERATINOCYTES

CROSS REFERENCE TO RELATED APPLICATIONS

The present application claims priority to U.S. Provisional Patent Application No. 61/447,501, filed Feb. 28, 2011 entitled "Noninvasive Assessment of Keratinocytes," the entire disclosure of which is hereby incorporated by reference in its entirety.

GOVERNMENT INTERESTS

This invention was made with Government support under Grant/Contract No. 5-T32-CA106195 awarded by the National Institutes of Health. The Government has certain rights in the invention.

TECHNICAL FIELD

Embodiments herein relate to imaging technologies, and, in particular, to noninvasive assessment of keratinocytes.

BACKGROUND

Keratinocytes are born spherical in the deep basal layer and die flattened with a larger en face diameter in the superficial stratum corneum. Since chromatin filaments in nuclei are too small to scatter light efficiently, nuclei in keratinocytes appear dark. In the spinous and granular layers of the epidermis, the en face distribution of keratinocytes is grid-like, with a regular spatial frequency. Nuclei present as dark centroids in the grid. Since organelles and intercellular tissue constituents are comparably sized to the illumination wavelength and are of high refractive index relative to the surrounding medium, they provide bright contrast to the grid between nuclei in a characteristic honeycomb pattern.

The absence of the normal honeycomb pattern of epidermal keratinocytes has sensitivity and specificity of 87.5% and 52.1%, respectively for melanoma detection with the human eye. The pattern of keratinocytes is even more important in distinguishing between actinic keratoses and normal skin. Finally, the abundance of keratinocytes may be a target for cosmetic skin products.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

FIG. 1 illustrates detection of keratinocytes in accordance with various embodiments. In (a), an en face optical section through the undulating epidermal layers is shown. Where the section is deepest, super-nuclear melanin caps appear bright in the basal layer (labeled BL), granular keratinocytes appear with dark nuclei in the granular layer (labeled GL), and the superficial stratum corneum appears with constant bright contrast (labeled SC). The site of axial study is labeled (*). In (b), the mean image of 50 keratinocytes is chosen to represent the range of sizes. The data plotted through the image is the bisecting reflectance profile. In (c), the a and b parameters for the fits to 42 of the 50 representative keratinocytes are shown with a scatter plot. In (d), the analytical mask that approximates the average keratinocyte using <a> and <b> is shown. In (e), the result of mask application is shown where the white marks identify the centers of identified keratinocytes. In (f), the axial profile of keratinocyte populations is shown as identified by threshold T=0.44, 0.46, and 0.48 [–].

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

In various embodiments, methods, apparatuses, and systems for noninvasive assessment of keratinocytes are provided. In exemplary embodiments, a computing device may be endowed with one or more components of the disclosed apparatuses and/or systems and may be employed to perform one or more methods as disclosed herein.

Visualization of cells in skin, such as for the detection of cancer, normally requires invasive biopsy and review by a trained pathologist. A pathologist assesses the size, shape, and distribution of keratinocytes and identifies patterns typical of healthy skin or of skin cancer. However, embodiments herein provide methods for noninvasive assessment of keratinocytes. Digital images and processing of gray-levels are used to identify cells. Keratinocytes have a bright border which consists of high gray-levels in the cytoplasm, cell wall, and intercellular spaces and have a dark center which consists of low gray-level nuclear material. More specifically, embodiments provide an automated algorithm that may be used to identify keratinocytes, and/or to specify the coordinates/locations of keratinocytes, through noninvasive confocal imaging. Methods herein may be repeated to analyze other areas of tissue.

In accordance with an embodiment, a method is providing including comparing, by one or more computing devices, an unknown image segment to a known keratinocyte model image segment to determine the degree of match between the unknown segment and a model of a keratinocyte; comparing, by the one or more computing device, the determined degree of match to a predetermined value, and characterizing, by the one or more computing device, the particular segment of the sample as a keratinocyte if the determined degree of match is sufficient, such as equal to or above the predetermined value. The degree of match may be determined by any suitable method/calculation to determine the degree of similarity. The degree of match may include symmetry measurements and mathematical operations such as subtraction, division and multiplication of the keratinocyte model and the unknown image segment.

In an embodiment, the predetermined value may be a range or a single value.

For example, a method is provided in which the difference between the reflectance gray-level values in a particular power normalized segment of an image and a power normalized model of a keratinocyte is examined, and, if the difference is equal to or below a defined threshold value (T) such as but not limited to: T=0.4-0.6, T=0.5, or T=0.44-0.48, for example T=0.44, T=0.46, or T=0.48, the image is determined to depict a keratinocyte. A comparative analysis may also be used to determine that an image does not depict a keratinocyte, such as if the comparative difference is equal to or larger than a defined threshold value.

Thus, in an embodiment, there is provided a method for characterizing keratinocytes, comprising comparing, by one or more computing device, an unknown image segment to a known keratinocyte model image segment to determine a difference value between reflectance gray-values of the particular segment of the diagnostic image and a value derived from a model of a keratinocyte; comparing, by one or more computing device, the determined difference to a predetermined threshold; and characterizing, by one or more computing device, the particular segment of the sample as a keratinocyte if the determined difference is equal to or below the predetermined threshold.

In embodiments, the unknown image segment may be n-dimensional, such as a 3-dimensional image of a cell volume within a tissue volume or a 4 dimensional image of a keratinocyte maturing as it migrates and changes shape and volume from the basal layer to the stratum corneum. The unknown image segment may be (a) a line sampled through a living cell (1D) where the digital reflectance value on the line follows an analytical function such as an error function as described in [0027] or any other such mathematical function, (b) on a plane (2D) bisecting a living cell center (1D function) where the 1D function is rotated in an en face plane about the cell center, (c) a volume (3D) where multiple error functions define directional cell aspects, or (d) a movie (4D) digitally sampled and analyzed over a life-cycle under cellular maturation.

As used herein, the term "en face" refers to a 2-dimensional image of a plane parallel to the surface of the tissue.

In an embodiment, the unknown image segment may be acquired by noninvasive imaging with cellular resolution. Examples of suitable noninvasive imaging methods include confocal microscopy, high frequency ultrasound, optical coherence tomography, photo-thermal microscopy, etc.

Keratinocytes in epidermis, which have bright cytoplasmic contrast around the periphery and dark nuclear contrast in reflectance confocal microscopy (RCM), were modeled with a simple error function approximation of the reflectance profile: erf( ). The error function is a sigmoidal mathematical function that can be entirely specified by two parameters. Because the shapes and sizes of keratinocytes vary, the two variables that must be used in combination with erf( ) can be specified to make the function fit any particular cell precisely. Forty-two example keratinocytes were identified as a training set that characterized the nuclear size a=8.6+/−2.8 μm and reflectance gradient b=3.6+/−2.1 μm at the nuclear/cytoplasmic boundary. These mean a and b parameters were used to create a rotationally symmetric erf( ) mask that approximated the mean keratinocyte image. This means that the average keratinocyte size and profile edge slope (represented by a and b respectively) were used to create the keratinocyte model, which in this case is a 2-dimensional map of simulated reflectance. In this paradigm, the rotationally symmetric gray-level brightness reflectance mask (because cells appear circular) created by one a,b parameter pair, erf( ) mask is the assumed model of a single keratinocyte. A computer vision algorithm used the erf( ) mask to scan RCM images identifying the coordinates of keratinocytes, noting where the mask appeared similar to the image in any particular region. Applying the mask to the confocal data and subtracting the mask value from the image value at all points throughout the image and noting where the subtraction yielded a small number (smaller than a chosen threshold) identified the positions of keratinocytes in the epidermis.

As used herein with respect to image processing, a "mask" is a term for a model image segment (such as the keratinocyte model) from which similar regions are to be searched in an unknown image segment.

This simple model may be used to noninvasively evaluate keratinocyte populations as a quantitative morphometric diagnostic in skin cancer detection and evaluation of dermatological cosmetics. Methods herein may be used as a secondary test in conjunction with, or as a follow-on to, other cancer detection methods, such as an imaging method configured to identify pigmented cells. Alternatively, methods described herein may be used to identify healthy skin cells. The honeycomb pattern in the en face plane of evenly packed keratinocytes and the evolution of maturation from round cells deeper near the basal cell layer and flatter cells near the surface stratum corneum are both indicative of vitality.

Materials and Methods

A single confocal stack (3D image) acquired at the site of a melanocytic nevus with the Vivascope 1500 (Lucid, Inc.) spanned 500 μm-by-500 μm in the en face plane and extended 175 μm axially to include the superficial stratum corneum, middle granular and spinous epidermis, the deeper basal layer, and the underlying dermis. The digital size of the image was 1000 pixels-by-1000 pixels in the en face plane and 175 optical sections deep.

Keratinocyte Identification Algorithm Development:

An optical section was chosen in the mid-level epidermis (FIG. 1a) 45 μm deep in the 3D confocal image. This section contained mostly granular and spinous keratinocytes of various sizes and occasionally (due to spatially undulating tissue a-planarity) regions of bright pigmented basal cells and stratum corneum. This section was chosen to represent important tissue regions: stratum corneum and granular/spinous/basal epidermis. Fifty spinous or granular keratinocytes were manually selected to represent various en face diameters, and averaged (FIG. 1b). Surrounding each cell in the en face plane, a square window of 15 μm (30 pixels) was extracted.

The 30 pixel window size was chosen to safely encapsulate the larger keratinocytes while not extending into adjacent keratinocytes for smaller sizes.

Erf( ):

Since visually the reflectance profile (R) of a line sampled to bisect the average of the 50 keratinocyte images (FIG. 1b) appears to transition from dark nucleus to bright cytoplasm in the form of an error function, the following analytical expression (eq. 1) was adopted.

$$R = erf\left(\frac{x-a}{b}\right) \quad (1)$$

where a and b are fitting parameters that shape the contour of the error function; a defines the diameter of the putative cell and b defines the slope at the half max of the nuclear-to-cytoplasm brightness transition region. In Equation 1, x represents the distance from any point to the center of the keratinocyte model.

By substituting $r=sqrt(x^2+y^2)$ for x, the analytical expression (eq. 1) may be adapted to represent a two dimensional (en face) cell image, which may be compared to an equally sized window of the image as a mask. Before the least squares difference was computed between the mask and the image window, each image window was normalized so that the minimum brightness was zero and the sum of brightness counts (pixel intensity) across all the pixels in the image window was equal to one. This step enables the model to be generalized across a wide range of overall brightness levels, which is important since different microscopes/imaging devices can have different gain factors. The iterative least-squares fitting used fminsearch( ) in MATLAB, which is a multidimensional unconstrained nonlinear minimization (Nelder-Mead), to find the a and b parameters that fit each of the 50 keratinocytes. Of the 50 fitted a,b pairs, the 84% (42) that reached convergent fits were selected as a cluster for analysis.

The clustered a,b pairs (FIG. 1e) yielded a mean a,b pair that was used to create an analytical mask (FIG. 1c), which serves as the model of the keratinocyte reflectance and that was re-applied to the data to identify keratinocytes. A threshold was chosen during this data analysis of T=0.46 (with standard cross-validation techniques) such that if the difference between the power-normalized mask and the image window was less than the threshold T, the region was designated as a keratinocyte. The mask was applied to the en face optical section (FIG. 1a) as well as to an en face sub-region of a 100 μm-by-100 μm square centered at the asterisk (*) in FIG. 1a over the full depth range of 175 μm. The restriction to the 100 μm-by-100 μm square minimized the axial spread of cell populations due to tissue axial undulation of the Rete ridges.

Results

The fit parameters a and b for the 42 convergent fits were normally distributed (FIG. 1e). The 8 outliers, where the fitting routine did not converge, yielded unreasonable a,b results and had no apparent order. The resulting cell size parameter was a=8.6+/−2.8 μm and the transition slope parameter was b=3.6+/−2.1 μm. FIG. 1c shows the analytical model mask constructed from the mean of the a,b parameters shown in FIG. 1e. FIG. 1d shows the mask-scanning result where the analytical model was applied as a mask to the entire optical section. Application of the mask identifies the points in the image where the mask most accurately mimics the local value of the image, so, in this step, areas that appeared to be keratinocytes were identified. White dots indicate identified keratinocytes.

In the axial scan centered at the marked asterisk (*) in FIG. 1a, the number of automatically identified keratinocytes was scored for each optical section throughout the 3D confocal image stack, i.e., as a function of depth. This axial analysis showed (FIG. 1f) that the number of keratinocytes identified by the mask at each depth is large for the epidermis and zero in the deeper dermis. Results were scored for various threshold values (T=0.44, T=0.46, and T=0.48) to illustrate the range from loose criteria (T=0.48) where false-positives are scored in the dermis, to strict criteria (T=0.44) where false negatives are scored in the granular and basal layers. For validation, an expert confocal reviewer analyzed the data blinded to the algorithm outputs and reported the surface-depth of the stratum corneum, stratum granulosum, basal layer, and dermis as 24 μm, 39 μm, 59 μm and 70 μm, respectively.

Discussion

The number of keratinocytes reported here (10 per en face 0.01 mm$^2$ for T=0.44, FIG. 1f) agrees with visual counts of 1000 per en face mm$^2$ first reported. The algorithm presented here identifies dark nuclei, hence the sub-type of keratinocyte detected lacks heavy pigment. Because the keratinocyte detection algorithm looks for dark cellular centroids, basal keratinocytes with dense pigment that present solid bright contrast in the center may not be detected unless an optical section slightly deeper than the nuclear melanin cap shows a dark nucleus.

Keratinocyte presence and distribution of keratinocytes may be important metrics for a number of applications. Potential applications include: 1) diagnosing melanoma, such as using the absence of a healthy keratinocyte pattern as an indicator of melanoma, 2) scoring dyskeratosis to objectively categorize or identify actinic keratosis vs. normal skin and vs. squamous cell carcinoma, and 3) grading of mild dyskeratotic keratinocytes for the identification of early signs of aging skin and risk of developing skin cancers.

In another embodiment, techniques described herein may be used to characterize the average en face diameter of nuclei as a function of depth. Making the reasonable assumption that the nucleus diameter is slightly less than half that of the entire cell, the mean nuclear diameter (a=8.6 μm) reported here compares well to the published diameter for the entire cell: 15-35 μm. The maturation cycle, where spherical spinous keratinocytes near the basal layer develop into wider and flatter granular keratinocytes, indicates healthy skin. In squamous cell carcinoma (SCC), the atypical pattern of anaplasia constitutes reversal of differentiation in maturation. Therefore, the axial size distribution of keratinocytes is a valuable diagnostic.

Beyond cancer, the cosmetic industry lacks a noninvasive method to quantify the effects of treatments on keratinocyte populations. The overall melanin concentration is expected to change across skin types and in the cosmetic bleaching process for post-inflammatory pigmentation and melasma. However, the melanin distribution in cells is not expected to change, so the masking technique is expected to be easily adapted to a wide range of dermatological applications provided that assumptions and ad-hoc thresholds remain minimized.

In addition to the quantitative nature of the presented technique, vision is extended beyond the dynamic range of the human eye. An example is the void section in the top central portion of FIG. 1d, which appears to be completely outside the tissue. The subtle contrast of the superficial stratum corneum (which is "index-matched" by the crodomol oil used to couple the skin to the imaging window) has dropped below the dynamic range of detection for the human eye. However the algorithm reveals an important diagnostic finding: parakeratosis, the presence of nucleated cells in the stratum corneum. Both the quantification of patterns already perceived by the eye and the ability of the machine vision algorithm to rapidly change the dynamic range of the analysis may enhance morphometric analysis. In conclusion, automatic identification of epidermal keratinocytes is a promising technique that extends diagnostic vision through RCM.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A non-invasive method for characterizing keratinocytes, comprising:
   comparing, by one or more computing device, an unknown image segment to a known keratinocyte model image segment to determine the degree of match between the unknown segment and a model of a keratinocyte;
   comparing, by the one or more computing device, the determined degree of match to a predetermined value; and
   characterizing, by the one or more computing device, the particular segment of the sample as a keratinocyte based on the determined degree of match;
   wherein the degree of match is identified by determining a difference value between reflectance gray-values of the particular segment of the diagnostic image and a value derived from the model of the keratinocyte;
   wherein characterizing the particular segment of the sample as a keratinocyte comprises characterizing the particular segment of the sample as a keratinocyte if the determined difference value is equal to or below a predetermined threshold;
   and wherein the predetermined threshold is from 0.4 to 0.6.

2. The method of claim 1, wherein the predetermined threshold is from 0.44 to 0.48.

3. The method of claim 1, wherein the predetermined threshold is 0.46.

4. The method of claim 1, wherein the unknown image segment and/or the keratinocyte model is n-dimensional.

5. The method of claim 4, wherein the unknown image segment is a line sampled through a living cell (1D) where the digital reflectance value on the line follows an analytical function.

6. The method of claim 4, wherein the unknown image segment is on a plane (2D) bisecting a living cell center (1D function) where the 1D function is rotated in an en face plane about the cell center.

7. The method of claim 4, wherein the unknown image segment is a volume (3D) where multiple error functions define directional cell aspects.

8. The method of claim 4, wherein the unknown image segment is a movie (4D) digitally sampled and analyzed over a life-cycle under cellular maturation.

9. The method of claim 1, further comprising acquiring the unknown image segment by noninvasive imaging with cellular resolution.

10. The method of claim 9, wherein the noninvasive imaging comprises at least one of confocal microscopy, high frequency ultrasound, optical coherence tomography, and photo-thermal microscopy.

11. The method of claim 1, further comprising:
    characterizing the particular segment of the sample as not a keratinocyte skin cell if the determined difference is above the predetermined threshold.

12. The method of claim 1, further comprising establishing the keratinocyte model image segment by a function approximation of a reflectance profile using reflectance confocal microscopy.

13. The method of claim 1, further comprising establishing the keratinocyte model image segment by a compound function of multiple functions approximating a reflectance profile using reflectance confocal microscopy.

14. The method of claim 1, further comprising establishing the keratinocyte model image segment by an error function approximation of a reflectance profile using reflectance confocal microscopy.

15. The method of claim 1, further comprising establishing the keratinocyte model image segment by an approximation of a fluorescence profile using fluorescence confocal microscopy.

16. The method of claim 1, further comprising characterizing a training set of keratinocytes by nuclear size and reflectance gradient at a nuclear/cytoplasmic boundary.

17. The method of claim 16, further comprising using the nuclear size and reflectance gradient to create a rotationally symmetric erf( ) mask that approximates a mean keratinocyte image.

18. The method of claim 17, further comprising using, by a computer vision algorithm, an erf( ) mask to scan RCM images to identify coordinates of keratinocytes.

19. The method of claim 18, further comprising identifying the coordinates of keratinocytes in epidermis by applying the mask to data obtained by performing the confocal microscopy.

20. The method of claim 19, further comprising establishing, by a computing device, a model for a particular patient's keratinocytes and using that model on additional areas of tissue other than an area on which the model was established.

21. The method of claim 1, wherein the keratinocytes are defined by bright cytoplasmic reflectance contrast around a periphery and a dark central nuclear contrast.

22. The method of claim 1, further comprising repeating the operations of the method to analyze a further segment of the image.

* * * * *